(12) United States Patent
Bloomstein

(10) Patent No.: US 11,498,436 B2
(45) Date of Patent: Nov. 15, 2022

(54) NEUTRALLY BUOYANT LIQUID SUPPLY UNITS FOR UNDERWATER VEHICLES

(71) Applicant: Massachusetts Institute of Technology, Cambridge, MA (US)

(72) Inventor: Theodore Bloomstein, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 162 days.

(21) Appl. No.: 15/930,376

(22) Filed: May 12, 2020

(65) Prior Publication Data
US 2021/0354571 A1 Nov. 18, 2021

(51) Int. Cl.
| | | |
|---|---|---|
| *B60L 50/75* | (2019.01) | |
| *B63G 8/08* | (2006.01) | |
| *H01M 16/00* | (2006.01) | |
| *H01M 8/04082* | (2016.01) | |

(52) U.S. Cl.
CPC .......... *B60L 50/75* (2019.02); *B63G 8/08* (2013.01); *H01M 8/04201* (2013.01); *H01M 16/006* (2013.01); *B60L 2200/32* (2013.01); *H01M 2220/20* (2013.01); *H01M 2250/20* (2013.01)

(58) Field of Classification Search
CPC ....... B60L 50/75; B60L 2200/32; B63G 8/00; B63G 8/08; H01M 8/04201; H01M 16/006; H01M 2220/20; H01M 2250/20
See application file for complete search history.

(56) References Cited

U.S. PATENT DOCUMENTS

| | | | | |
|---|---|---|---|---|
| 1,647,472 A | * | 11/1927 | Powelson | B64F 1/14 244/115 |
| 3,379,156 A | * | 4/1968 | Keays | B63G 8/24 405/185 |
| 5,379,267 A | * | 1/1995 | Sparks | B63B 22/18 441/28 |
| 7,987,805 B1 | * | 8/2011 | Buescher | B63G 8/14 114/330 |

(Continued)

OTHER PUBLICATIONS

An et al., Performance of an alkaline direct ethanol fuel cell with hydrogen peroxide as oxidant. Int J Hydrogen Energy. Feb. 4, 2014; 39(5):2320-2324.

(Continued)

*Primary Examiner* — Stephen P Avila
(74) *Attorney, Agent, or Firm* — Wolf, Greenfield & Sacks, P.C.

(57) ABSTRACT

An underwater liquid supply unit includes a first bladder containing a first liquid, a second bladder containing a second liquid, and a third bladder containing a third liquid. The combined volume of the first liquid, second liquid, and third liquid is neutrally buoyant relative to a surrounding medium the liquid supply unit is disposed in (e.g., in seawater). As the first liquid, second liquid, and third liquid are dispensed from the bladders, the bladders may reduce in size in at least one dimension. As the liquids are dispensed, the liquids may be dispensed in a predetermined volumetric ratio based on the density of the liquids to maintain neutral buoyancy of the combined volume of liquid. The underwater liquid supply unit may also include an integrated generator such as a fuel cell, as well as a propeller.

39 Claims, 5 Drawing Sheets

(56) References Cited

U.S. PATENT DOCUMENTS

2008/0023493 A1* 1/2008 Lavan .................. F17C 1/16
                                                    222/386.5
2013/0125806 A1   5/2013 Lubard

OTHER PUBLICATIONS

Luo et al., $Na BH_4/H_2O2_2$ fuel cells for air independent power systems. J Power Sources. 2008;185:685-690.
Manikowski et al., Development of a prototype pressure-balanced hydrazine fuel cell for deep submersibles. In: American Society of Mechanical Engineers (Series). 1969. 1-5.

* cited by examiner

NEUTRALLY BUOYANT LIQUID SUPPLY UNITS FOR UNDERWATER VEHICLES

GOVERNMENT LICENSE RIGHTS

This invention was made with Government support under FA8702-15-D-0001 awarded by the U.S. Air Force. The Government has certain rights in the invention.

FIELD

Disclosed embodiments are related to neutrally buoyant liquid supply units for underwater vehicles and related methods of use.

BACKGROUND

To date, non-nuclear based submersibles rely on batteries to power motors and actuators while submerged. More recently, fuel cell technology employing hydrogen/oxygen chemistry has also been investigated, due to the higher achievable energy densities possible compared to the most advanced lithium-ion based battery chemistries. However storing both the reductant (hydrogen) and oxidant (oxygen) on board in gas or liquid phases entails the use of high pressure tanks or liquid dewars extracting large drag, signature, and cost penalties for applications demanding extended range at arbitrary depth. Because liquid or solid based agents are simpler to store, carrier compounds, which release hydrogen and oxygen directly through thermal or chemically activated process are also now being considered. Some work has also demonstrated the use of hydrogen peroxide directly as the oxidant, as well as other liquid reductants such as alcohols, hydrazine, and borohydrides.

SUMMARY

In some embodiments, an underwater liquid supply unit includes a first bladder defining a first compartment for containing a first liquid, a second bladder defining a second compartment for containing a second liquid, a third bladder defining a third compartment for containing a third liquid, and a manifold connecting each of the first bladder, the second bladder, and the third bladder. The manifold is configured to provide a separate flow path for each of the first liquid, second liquid, and third liquid, and the first bladder, second bladder, and third bladder are configured to reduce in size in at least one dimension when the first liquid, second liquid, and third liquid flow out of the first, second, and third volumes respectively through the manifold.

In some embodiments, a method of operating a liquid supply unit includes dispensing a first liquid from a first volume, dispensing a second liquid from a second volume, dispensing a third liquid from a third volume, and maintaining a neutral buoyancy of the liquid supply unit during the dispensing of each of the first liquid, second liquid, and third liquid by dispensing the first liquid, second liquid, and third liquid in a predetermined ratio.

In some embodiments, an underwater liquid supply unit includes a first bladder defining a first compartment for containing a first liquid, a second bladder disposed inside of the first bladder defining a second compartment for container a second liquid, a third bladder disposed inside of the second bladder defining a third compartment for containing a third liquid, and a manifold connecting each of the first bladder, second bladder, and third bladder and configured to provide a flow path for each of the first liquid, second liquid, and third liquid. The first bladder, second bladder, and third bladder are coaxial, where the first bladder, second bladder, and third bladder are configured to reduce in size in at least one dimension when the first liquid, second liquid, and third liquid flow out through the manifold respectively.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
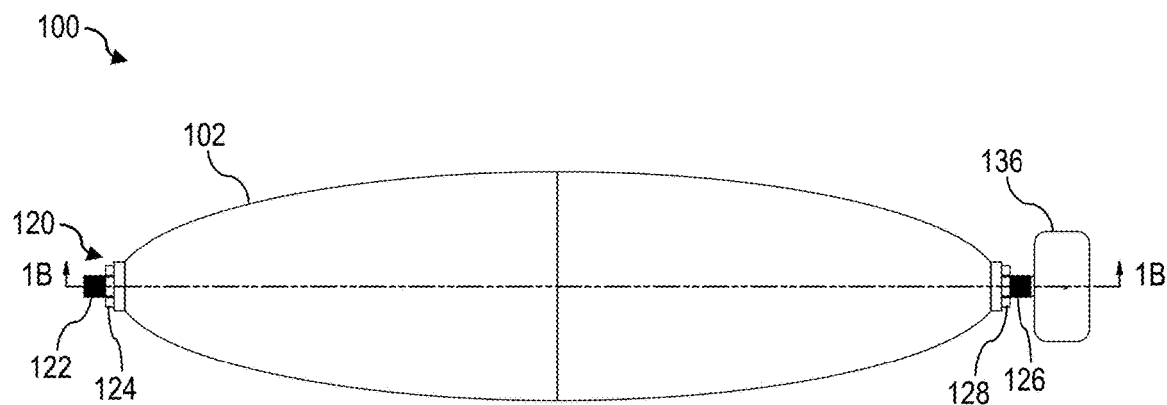
FIG. 1A is a top view of one embodiment of a liquid supply unit.

Conventional unmanned underwater vehicles have sought the benefits of extended range through enhanced energy sources. Typically, such conventional vehicles have looked to denser power sources to enhance range. However, adding a denser power source to an underwater vehicle may fail to effectuate significant range increases, as passive or active buoyancy systems are employed to account for the increased weight of the power source. In some vehicles, elastic bladders have been considered, but such systems do not employ neutrally buoyant fuel compositions and instead use a separate pressure chamber for ballasting, an arrangement which grows progressively larger as fuel is added increasing drag and system complexity.

In view of the above, the inventor has appreciated the benefits of a modular liquid supply unit for underwater vehicles that extends the range and persistence of such vehicles, for monitoring, craft recovery, infrastructure repair, and resource mining among any number of other uses. In particular, the inventor has recognized the benefits of a liquid supply unit including a combination of different liquids, some of which may be liquid fuels, that is neutrally buoyant. The use of such a neutrally buoyant combination of liquids may permit the range of an underwater vehicle to be augmented regardless of a depth at which the vehicle is operated at. Additionally, in some instances, liquid compositions whose reaction products can be safely discharged to the environment may be used. Accordingly, in some embodiments, the composition may be stored in elastic bladders, which progressively shrink during operation further improving range of an underwater vehicle from the reduction in drag.

The inventors have also recognized the benefits of a liquid supply unit including its own power generation and/or propulsion modules. That is, the inventors have recognized the benefits of a liquid supply unit that also includes a power generation and/or propulsion module, which in some instances may be an integrated structure that is neutrally buoyant. By also including integral power and propulsion, range for an associated underwater vehicle may be extended in a modular fashion while improving maneuverability by adding additional thrusters. Furthermore, such an arrangement may simplify distribution of energy from the liquid supply unit in the form of electricity rather than liquid supply.

In some embodiments, an underwater vehicle is augmented with one or more liquid supply units which may supply fuel, electricity, and/or propulsion to the underwater vehicle. Each liquid supply unit may contain a liquid oxidant, liquid reductant, and a ballasting liquid for buoyancy control stored in separate elastomeric bladders surrounding a central power train. Both the liquid composition and the central power train are configured to be neutrally buoyant. Unlike the fixed ballasting systems added to account for density mismatches in conventional systems, the liquid supply unit is configured to exhaust the ballasting liquid in proportion to the oxidant and reactant, which may be referred to as liquid fuel components, consumed to maintain neutral buoyancy of a combined volume of liquid in the liquid supply unit. Ballasting liquid may also be exhausted from the liquid supply unit to account for density variations from differences in sea-water temperature and salinity at varying depths, and compressibility of the liquid fuel and liquid supply unit itself at more extreme depths. In some embodiments, the ballasting liquid and the liquid fuel components may be selected so that the reaction product(s) of the fuel components and the ballasting liquid can be safely discharged with minimal energy penalty and environmental impact, allowing the drag profile of the liquid supply unit to progressively shrink as fuel is consumed. That is, the elastic bladders containing the liquids may reduce in size in at least one dimension. Accordingly, liquid supply units can therefore be added in a modular fashion to extend range and configured to enhance maneuverability without adjusting ballasting in other parts of the system.

In some embodiments, a liquid supply unit includes a first liquid (e.g., a reactant), a second liquid (e.g., an oxidant), and a third liquid (e.g., a ballasting liquid). One or more of the first, second, and third liquids may be employed as fuel to generate mechanical or electrical power. One of the liquids may be a ballasting liquid which is configured to provide a combined volume of the first liquid, second liquid, and third liquid a density that is approximately equivalent to, or within a desired range of, that of fresh water, seawater, or another liquid in which the liquid supply unit may operate. In this manner, the combined volume of first liquid, second liquid, and third liquid, may be approximately neutrally buoyant relative to a particular liquid environment (e.g., seawater). As some of the liquids are used in a reaction to generate mechanical or electrical energy, all three liquids may be exhausted in a predetermined ratio so that neutral buoyancy of the combined volume of liquid is maintained as those liquids are used. For example, if a first liquid is a reactant and a second liquid is an oxidant, these two liquids may be used in a predetermined ratio with a fuel cell to generate electricity based on a particular chemical equation. As these two liquids are used and the liquid products exhausted, the third liquid may be exhausted in proportion to maintain the overall density of the combined volume of liquid. That is, the exhausting liquid may be ejected into the environment as the other two liquids react to form a product that is also exhausted so that the overall density of the three combined liquids is maintained. In this manner, each of the three liquids may be consumed and/or exhausted in a predetermined ratio so that neutral buoyancy of the combined liquid volume is maintained throughout a power generation process. In some embodiments, the first liquid may be ethanol diluted with aqueous sodium hydroxide (e.g., a reductant), the second liquid may be hydrogen peroxide (e.g., an oxidant), and the third liquid may be fish oil (e.g., ballasting liquid). Of course, any suitable combination of liquids may be employed to achieve neutral buoyancy in a given liquid environment, as the present disclosure is not so limited. In some embodiments, gases or other non-liquid products may also be exhausted from the liquid supply unit alone or in combination with exhausted liquids. For example, a reaction product may include one or more gases. Accordingly, such non-liquid products may also be exhausted from the liquid supply unit in a predetermined ratio to maintain the neutral buoyancy of the liquid supply unit, as the present disclosure is not so limited.

It should be understood that the liquid fuels and ballasting liquids used with the systems and methods described herein may correspond to any number of desired reactions and power production cycles (e.g. fuel cells, motors, etc.). However, in some embodiments, the liquid fuels may be a liquid reductant and a liquid oxidant provided to a fuel cell and a corresponding ballasting liquid may be used. Appropriate types of reductants may include, but are not limited to, ethanol, methanol, formate, ethylene glycol, hydrogen peroxide (as a reductant), hydrazine, and aqueous sodium borohydride with hydrogen peroxide as the oxidant. Examples of possible liquid oxidants include, but are not limited to, hydrogen peroxide, and derivatives of the alkylhydroperoxide or perchlorate families, with varying degrees of aquatic compatibility. Depending on the specific reactants used, the combined density of the liquid fuels may have densities either greater than or less than that of sea-water. Accordingly, ballasting liquids with densities either greater than or less than sea water, or another liquid medium a system is disposed in, may be used. This may include the use of ballast liquids such as oils (e.g. kernel or seed oils (almond, canola, coconut, corn, hazelnut, peanut) and fish oil and derivatives (e.g., cod liver)), alcohols (e.g. ethanol, n-propanol), and any other liquid with a desired density. Additionally, in some embodiments it may be desired to change a density of a ballasting liquid and/or liquid fuel. Thus, a dilutant may be included to any appropriate volume of liquid. Appropriate dilutants may either increase, or decrease the density of a volume of liquid they are mixed with. Further, appropriate dilutants may include, but are not limited to HOH (i.e. water). In view of the various ballasting liquids, liquid oxidants, liquid reductants, and dilutants listed above, it should be understood that the disclosed systems and methods are not limited to only the specific chemistries disclosed herein.

According to exemplary embodiments described herein, the three liquids employed on a liquid supply unit may have different volumes and densities that when combined have a combined density that is approximately that of seawater (e.g., 1.03 g/cm$^3$) or another liquid medium. Thus, in some embodiments, a combined density of the different liquid volumes may be greater than or equal to 0.9 g/cm$^3$, 0.95 g/cm³, 1.0 g/cm³ (the density of water). The combined density of the liquid volumes may also be less than or equal to 1.2 g/cm³, 1.1 g/cm³, 1.05 g/cm³, 1.03 g/cm³ (the density of sea water), 1.0 g/cm³ (the density of water), and/or any other appropriate density. Correspondingly, the combined density of the liquid volumes may between or equal to 0.9 g/cm³ and 1.1 g/cm³, 0.95 g/cm³ and 1.05 g/cm³, and/or any other appropriate combination for a desired application where, for example, energy is expended to retain a fixed depth position, but more rapid rates of ascent or descent are desirable. However, embodiments in which a combined density of the liquid volumes is either greater than or less than the ranges noted above are also contemplated, where, for example, the craft may reside primarily at the sea-floor or on the surface.

In some embodiments, a liquid supply unit includes three bladders, each configured to provide a compartment for a liquid. That is, a first bladder may be configured to contain a first volume of a first liquid, a second bladder may be configured to contain a second volume of a second liquid, and a third bladder may be configured to contain a third volume of a third liquid. Each of the three bladders may be formed of an elastic material, such that the size of each bladder may change based on the amount of liquid disposed within the bladder. For example, in some embodiments each of the bladders may have an ellipsoid shape, where a maximum transverse dimension (e.g. a diameter) normal to a longitudinal axis of the ellipsoid changes based on an amount on liquid disposed in the bladder. An elastic bladder may be formed of a suitable elastic material, such as polydimethylsiloxane, polyurethane, natural or synthetic rubber, or nitrile-buna-N. In some cases, the material for an elastic bladder may be selected based on the density (i.e., specific gravity) of the material, such that the elastic bladder itself may be neutrally buoyant or otherwise near neutral buoyancy in a given liquid environment (e.g., seawater). Of course, any suitably elastic materials may be employed having an appropriate density, as the present disclosure is not so limited.

According to exemplary embodiments described herein, an elastic bladder may have a density approximately equal to that of seawater or another liquid medium so that the elastic bladders are approximately neutrally buoyant. The density of an elastic bladder material may be greater than or equal to 0.9 g/cm³, 0.95 g/cm³, 1.0 g/cm³, 1.05 g/cm³, 1.1 g/cm³, 1.2 g/cm³, 1.3 g/cm³, and/or any other appropriate density. Correspondingly, a density of an elastic bladder material may be less than or equal to 1.6 g/cm³, 1.5 g/cm³, 1.4 g/cm³, 1.3 g/cm³, 1.2 g/cm³, 1.1 g/cm³, 1.0 g/cm³, and/or any other appropriate value. Combinations of the above-noted ranges are contemplated, including densities between 0.9 g/cm³ and 1.1 g/cm³. Of course, any suitable range of densities may be employed for the elastic bladders including densities both greater than and less than those noted above, as the present disclosure is not so limited.

In some embodiments, a liquid supply unit includes three bladders that are coaxial with one another. The three bladders may have approximately the same shape, but may have different sizes. The bladders may be placed within one another to form compartments having an ellipsoidal ring or spherical ring shape. That is, a first bladder may define an outermost dimension of the liquid supply unit. A second bladder may be positioned inside the first bladder, such that a first compartment is formed between the first bladder and the second bladder. The first bladder may function as an outermost wall of the first compartment, whereas the second bladder functions as an innermost wall of the compartment. A third bladder may be placed inside of the second bladder to form a second compartment between the third bladder and the second bladder. The second bladder in this instance may function as an outermost wall of the second compartment, whereas the third bladder functions as an innermost wall. Both the first and second compartments may have an ellipsoidal ring or spherical ring shape. The third bladder may form an internal third compartment disposed within the first and second volumes. According to this arrangement, multiple liquids may be stored in a distributed manner around a length and circumference of the liquid supply unit, keeping a center of mass and buoyancy of the liquid supply unit in a central location due to an even density gradient along the length of the liquid supply unit. Additionally, as the first bladder defines an outermost shape of the liquid supply unit, the shape of the first bladder may be shaped to reduce the effects of drag on the liquid supply unit.

In some embodiments, a liquid supply unit includes three coaxial bladders and a pressure vessel extending along at least a portion of the length of the bladders and that is used to support the bladders. The pressure vessel may be centrally disposed relative to the bladders, such that the pressure vessel runs along a longitudinal axis of each of the three bladders. The pressure vessel may provide structural strength to the liquid supply unit, and may allow the liquid supply unit to be physically coupled to an underwater vehicle or other liquid supply units (e.g., with scaffolding). In some embodiments, the pressure vessel may include a generator configured to generate electrical or mechanical energy from at least one of three liquids contained in the liquid supply unit. In some embodiments, the generator may be a fuel cell. According to this embodiment, two of the liquids (a reactant and an oxidant) may be used by the fuel cell to generate electrical energy. This internally generated energy may be stored onboard the liquid supply unit in the pressure vessel. For example, the pressure vessel may contain a battery configured to store power from the fuel cell. In some cases, the electrical power generated by the liquid supply unit may be delivered to an associated underwater vehicle. In some embodiments, the liquid supply unit may include a motor and propeller so that the liquid supply unit may generate its own thrust. The fuel cell may deliver power to the motor so that a liquid supply unit may be self-powered and is not reliant on existing thrusters of an associated underwater vehicle. When multiple power propulsions units are employed together, such an arrangement may provide maneuverability by increasing the number of thrusters that may apply force or torque vectors to a combined vehicle. While exemplary embodiments described herein may employ motors and propellers, other propulsion systems may be employed such as impeller jet systems, as the present disclosure is not so limited.

In some embodiments, a method of operating a liquid supply unit includes dispensing a first liquid from a first volume of the liquid supply unit, dispensing a second liquid from a second volume of the liquid supply unit, and dispensing a third liquid from a third volume of the liquid supply unit. The first volume, second volume, and third volume may be defined by a first elastic bladder, second elastic bladder, and third elastic bladder, respectively. A combined volume of liquid of the first volume, second volume, and third volume may be neutrally buoyant in a predetermined liquid operating environment (e.g., seawater). As the first, second, and third liquids are dispensed, they may be dispensed in a predetermined ratio so that the neutral buoyancy of the combined volume is maintained. In some embodiments, two of the three liquids may be dispensed in a predetermined ratio based on a chemical equation (e.g., for a fuel cell reaction). The third liquid may be dispensed in a ratio corresponding to the first two liquids to maintain an overall density of the combined volume. As the three liquids are dispensed, the first bladder, second bladder, and third bladder may reduce in size in at least one dimension (e.g., maximum transverse dimension relative to a longitudinal axis of the device). The bladders may definer an outmost shape of the liquid supply unit, so the reduction in size may reduce the cross-sectional area of the liquid supply unit to correspondingly reduce drag when moving at a given velocity. In some embodiments, two of the liquids may be employed to generate power. For example, two of the liquids may be employed with a fuel cell disposed in the liquid supply unit, and the electrical power generated may be stored onboard the liquid supply unit or distributed to an associated underwater vehicle. In some cases, the method may include generating thrust on the liquid supply unit (e.g., with a motor and propeller).

According to exemplary embodiments described herein, a liquid supply unit may be employed with an associated underwater vehicle. In some cases, multiple liquid supply units may be combined in use with an underwater vehicle. Any suitable number of liquid supply units may be employed to enhance the range of a given underwater vehicle. In some cases, liquid supply units may be changed or swapped out in an underwater environment once exhausted, such that the range of an underwater vehicle may be further enhanced. According to this embodiment, an underwater vehicle may be able to operate effectively indefinitely if supplied with enough modular liquid supply units. In some embodiments, an underwater vehicle may coordinate the operation of the liquid supply units. That is, the underwater vehicle may coordinate power and/or thrust generation from a central processor. In some embodiments, for a battery based underwater vehicle, the vehicle may detach from the liquid supply units at various points along a given route, returning to recharge its own internal power system from the liquid supply units. This approach may be well suited to swarm architectures being considered as the extended range allows fan-out rather than sequential deployment.

According to exemplary embodiments described herein, one or more functions of a liquid supply unit may be coordinated by one or more processors located on the liquid supply unit or an associated underwater vehicle. That is, one or more processors may execute processor readable instructions stored on non-volatile memory to perform the various methods described herein. The one or more processors may control valves, regulators, pumps, and/or other components as described below that control the various flows of liquids throughout a liquid supply unit. The one or more processors may also coordinate power generation and/or thrust generation, for example, by controlling the rates of liquid flow to a fuel cell and/or electrical flow to a motor. In some embodiments, the liquid supply unit may also manage storage of excess energy in onboard storage (e.g., batteries). The one or more processors may also control environmental factors, including internal cooling and heating, as well as depth control (e.g., dynamic ballasting). Of course, the one or more processors may control or coordinate any number of functions of the liquid supply unit, as the present disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a top view of one embodiment of a liquid supply unit 100. As shown in FIG. 1A, the liquid supply unit includes an elastic bladder 102 which is configured to expand and contract in size depending on an amount of liquid disposed inside of the elastic bladder 102. The elastic bladder is supported by a central pressure vessel 120 that extends along a longitudinal axis of the bladder 102, as will be discussed further with reference to FIG. 1B. According to the embodiment of FIG. 1A, the elastic bladder is held by a forward cap 122 and an aft cap 126. The forward cap is threaded and secured to the elastic bladder 102 with a forward nut 124. Likewise, the aft cap is threaded and secured to the elastic bladder 102 with an aft nut 128. Of course, while the forward and aft caps of FIG. 1A are threaded and secured to the elastic bladder with nuts, any suitable fastener may be employed, as the present disclosure is not so limited. As the elastic bladder 102 is fixed to the central pressure vessel, the elastic bladder may expand and contract in a radial direction. That is, as a volume of liquid within the elastic bladder is diminished, the elastic bladder may have its maximum transverse diameter reduce in size. Accordingly, as liquid inside of the bladder is expended to generate mechanical or electrical energy, the liquid supply unit may have a reduced cross-sectional area and correspondingly a reduced drag coefficient.

According to the embodiment of FIG. 1A, the liquid supply unit 100 includes three total bladders. Bladder 102 is a first, outermost bladder. A second and third bladder are disposed inside of the first bladder 102 coaxial with the first bladder and the pressure vessel 120. Each of the three bladders may define at least one compartment or volume of a liquid. Accordingly, the liquid supply unit 100 is configured to contain three separate liquids in at least one corresponding volume. Each of the first, second, and third bladders are configured to expand or contract based on the volume of the liquids disposed therein. The arrangement of the bladders and liquid volume will be discussed further with reference to FIG. 1B.

According to the embodiment of FIG. 1A, the underwater vehicle 100 has a streamlined shape to reduce form and skin drag, thereby increasing range. Without wishing to be bound by theory, form drag quantifies the work to overcome pressure differences along the body, and is dependent on the presented cross-section the craft makes with a surrounding external liquid in the direction the craft is traveling. As noted above, the elastic bladder 102 is configured to reduce in size as liquid inside of the bladder is exhausted, such that the cross-sectional area may be reduced and the form drag correspondingly lowered for a given velocity. Structures with smoothly varying geometries maintain a semi-continuous region of laminar flow over the craft minimizing turbulent flow, or regions with vortices. Accordingly, the elastic bladder 102 of FIG. 1A may be formed in an ellipsoidal shape. The skin drag is a function of the surface area of the craft, outer material and finish used, and viscous nature of the surrounding liquid (e.g. water). As the elastic bladder 102 contracts, the overall surface area of the elastic bladder presented to water may be reduced, thereby also reducing a skin drag on the liquid supply unit at a given velocity.

In the embodiment of FIG. 1A, the liquid supply unit 100 may be configured to be neutrally buoyant, so that power does not have to be expended to maintain a fixed depth in a given liquid environment (e.g., seawater). Since most of the materials and components within the liquid supply unit may be made from materials with higher density than that of sea-water (e.g., the pressure vessel 120, forward cap 122, aft cap 126, etc.), additional material with densities lower than that of sea-water may be added. For example, in some embodiments, syntactic foam composites embedded with hollow microspheres may be employed in the liquid supply unit to achieve an overall vehicle density that is equivalent to that of the surrounding liquid environment. In some embodiments, a dynamic ballasting system may also be employed to compensate for density variations from changes in water temperature and salinity, and as the structure undergoes compression at extreme depths. However, such a dynamic ballasting system may be dramatically smaller than in other typical systems. The dynamic ballasting system may exchange water (e.g., seawater) with compressed air within a sealed container within the liquid supply unit. According to the embodiment of FIG. 1A, liquids stored onboard the liquid supply unit may also have a combined volume that is also neutrally buoyant. For example, where three different liquids with three different densities are used different volumes of the three liquids may be used inside of the liquid supply unit so that the overall combined volume has a neutrally buoyant density. Thus, the overall liquid supply unit 100 may be neutrally buoyant in in a desired liquid environment (e.g., seawater).

In some cases, it may be desirable to provide the liquid supply unit 100 with its own thrust to enhance maneuverability of an associated underwater vehicle and/or an array of multiple liquid supply units. As shown in FIG. 1A, the liquid supply unit includes a ducted propeller 136, or other appropriate propulsion system, which may be coupled to a motor positioned in the pressure vessel 120. Accordingly, the liquid supply unit may generate its own power and may effectively function as an underwater vehicle. When employed in combination with other liquid supply units or an associated underwater vehicle, the ducted propeller 136 may be combined with other such propellers or thrusters on the associated liquid supply units and/or underwater vehicle. In such an embodiment, control of the overall thrust may be achieved by passing electrical signals between the associated liquid supply units and underwater vehicles. With multiple thrusters, an overall system allows arbitrary pitch and yaw motion around a central point. Multiple counter-rotating drives may also improve stability in finned propulsion systems. Of course, any suitable number of thrusters may be employed on a liquid supply unit, including zero and one, as the present disclosure is not so limited.

According to the embodiment of FIG. 1A, the central pressure vessel 120 may include a generator and/or energy storage. In some embodiments, the central pressure vessel may include a fuel cell configured to convert multiple liquids stored in the liquid supply unit to electrical energy. The energy storage may be configured as one or more batteries electrically connected to the generator. An exemplary schematic of components internal to the pressure vessel 120 is described further with reference to the exemplary embodiment of FIG. 3. According to the embodiment of FIG. 1A, the central pressure vessel 120 or spine may also contain sensors, communication gear, a payload, and/or any other desired component.

In some embodiments, multiple liquid supply units 100 may be arrayed around a central unit or underwater vehicle containing payload sensors, communication gear, ballasting, and a power source. The liquid supply units, in effect, may serve in analogous fashion to drop-tanks used to extend aircraft range. That is, the underwater vehicle may employ the liquid supply units 100 to extend its own range, detaching from the liquid supply units when the liquid fuel contained by the liquid supply units is expended. The liquid supply units may also be offset from the underwater vehicle to avoid obstructing any side mounted sensors of the vehicle. One such embodiment will be discussed further with reference to FIG. 2.

Figure 1B:
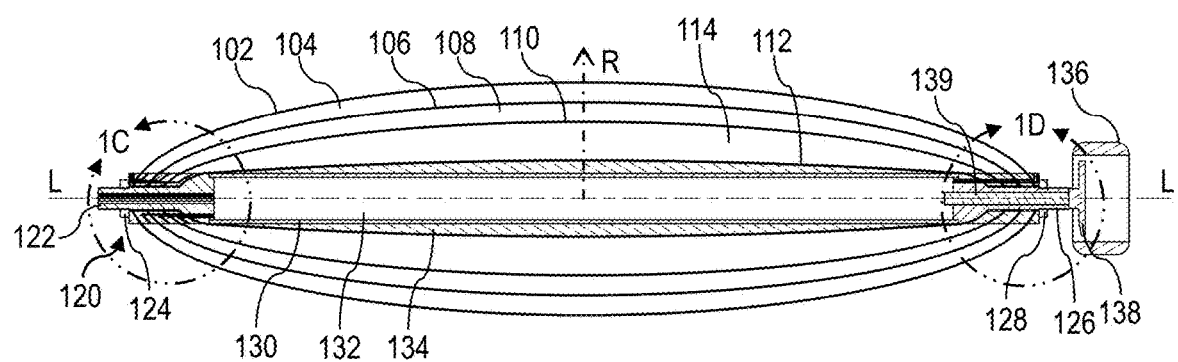
FIG. 1B is a cross-sectional view of the liquid supply unit of FIG. 1A taken along line 1B-1B.

FIG. 1B is a cross-sectional view of the liquid supply unit 100 of FIG. 1A taken along line 1B-1B. As shown in FIG. 1B, the liquid supply unit includes three concentric chambers formed by elastic bladders. The first elastic bladder 102 forms an outmost wall of the liquid supply unit, a second elastic bladder 106 is positioned inside of the first elastic bladder. Between the first elastic bladder and the second elastic bladder is a first compartment 104 defining a first volume for liquid. In the embodiment of FIG. 1B, the first compartment may contain an oxidant. Inside of the second elastic bladder 106 is a third elastic bladder having an outer wall 110 and an inner wall 112. A second compartment 108 is formed between the second bladder and the outer wall 110 of the third bladder. In some embodiments, the second compartment may contain a reactant (e.g., a reductant). The third bladder forms a third compartment 114 between the inner wall 112 and the outer wall 110, which may contain a ballasting liquid. Of course, while the compartments of the embodiment of FIG. 1B may be configured to contain specific liquid, each of the compartments may contain any liquid in any order, as the present disclosure is not so limited. According to the embodiment of FIG. 1B, each of the liquids disposed inside of the liquid supply unit 110 may have a desired density and volume. A combined volume of the three liquids may have an overall density approximately equal to that of seawater (or another liquid environment), such that the combined volume is neutrally buoyant in the desired operating medium. As the three liquids are exhausted, each of the bladders may diminish in size in at least one dimension. In the embodiment of FIG. 1B, a maximum transverse diameter taken perpendicular to a longitudinal axis of the bladders may decrease when liquid is exhausted. That is, the bladders contract in a radial direction R.

According to the embodiment of FIG. 1B, the bladders 102, 106, 110, 112 are constructed from elastic materials. In some embodiments, the bladders may be formed of polydimethylsiloxane, as its specific gravity is well matched to sea-water, is non-biocidal, does not readily foul, and is generally chemically inert. In some embodiments, the bladder walls may also include a conformal coating to impart greater chemical resistance depending on the liquids disposed within the compartments and their concentrations. In some embodiments, such a coating may include parylene or combinations of layered organic polymers and atomic scale deposited thin film inorganics to limit pin-holes. In some embodiments, the elastic bladders may be formed of polyurethane, natural or synthetic rubber, or nitrile-buna-N. In some cases, as the bladder wall material may not have a specific gravity equivalent to that of seawater, foam 134 may be positioned around the centralized pressure vessel 120 internal to the inner wall 112 of the third bladder. According to the embodiment of FIG. 1B, the compartments 104, 108, 114 are open chambers that have a roughly ellipsoidal ring shape. However, in some embodiments, the bladders may contain internal meshing to provide additional structural support and dampening as the craft accelerates, deaccelerates, or encounters external forces from changing currents. Of course, the compartments may have or lack structural supports, as the present disclosure is not so limited.

As noted previously, the liquid supply unit 100 may contain a liquid oxidant, liquid reductant, and additional ballasting liquid contained in separate concentric compartments 104, 108, 114 positioned around a central pressure vessel 120 running along a length of the bladders coaxial with a longitudinal axis L. The pressure vessel 120 includes a tubular spine 130 which forms a pressure vessel compartment 132 therein. The pressure vessel compartment 132 may be protected from the pressured experienced by the liquid supply unit at depth. As will be discussed further with reference to FIG. 3, the pressure vessel compartment 132 may contain a power train having a generator and a motor, where the power train converts the chemical energy of the oxidant and reductant into thrust in a controlled trajectory. That is, the power train may provide mechanical power to a propeller blade 138 via a shaft 139 so that the liquid supply unit may generate its own thrust. As the pressure vessel 120 and components positioned therein (for example, see FIG. 3) may be denser than that seawater, a volume and density of the foam 134 may also be configured to compensate and provide a neutral buoyancy for the pressure vessel 120 relative to the surrounding liquid environment. Thus, the foam 134 may provide neutral buoyancy for the fixed (i.e., non-liquid) components of the liquid supply unit 100.

According to the embodiment of FIG. 1B, the bladders 102, 106, 110, 112 are attached to the pressure vessel 120 at the forward and aft portions of the liquid supply unit 100. In particular, the bladders are attached to a forward cap 122 and an aft cap 126 with a forward nut 124 and an aft nut 128, respectively. In some embodiments, and as discussed further with reference to FIG. 1C, each of the bladders may be separated by machined disks in the forward cap 122 with patterned channels that both retain each bladder and provide a pathway for liquid to fill and be extracted from each chamber 104, 108, 114. Each bladder may also function as a gasket, with patterned pathways in each bladder overlaying each channel in the forward cap, providing a continuous pathway.

A center shaft of the forward cap 122 with tightening nut 124 compresses the structural components of the forward cap against the individual bladders to secure the bladders and to form sealed liquid pathways and compartments to prevent intermixing between liquids. In some embodiments, the nut 124 may be tightened to pre-stress the bladder materials to a level higher than the maximum pressure the vessel will experience. The structural components and fittings of the forward cap 122 may be constructed from traditional high strength material such as titanium, stainless-steel, or any other suitable materials commonly used to fabricate structural components in underwater vehicles, as the present disclosure is not so limited. According to the embodiment of FIG. 1B, the bladders 102, 106, 110, 112 are secured to the aft cap 126 in a manner similar to that of the forward cap 122. That is, the bladders are attached to the aft cap using structural disks formed in the aft cap and a clamping aft nut 128. As will be discussed further with reference to FIG. 1D, the aft cap 126 may provide pathways for liquid products and ballasting liquid exhaust. Furthermore, the aft cap provides an exit for a shaft 139 of the propeller blade 138 and in some embodiments may function as a shaft seal or stuffing box. Of course, in some embodiments, the propeller may be driven by a fully-flooded motor or any other suitable thruster arrangement so that no shaft seal is used between the pressure vessel 120 and the propeller 138, as the present disclosure is not so limited.

In some embodiments, the liquids inside each of the bladders 102, 106, 110, 112 may be pre-pressurized to match a maximum pressure expected at depth. Accordingly, the bladders may be pre-stressed such that pressure experienced during operation at depth does not significantly deform the elastic bladders or the connecting components of the pressure vessel 120. Of course, the various components of the liquid supply unit 100 may be pre-stressed by any suitable amount, as the present disclosure is not so limited in this regard.

Figure 1C:
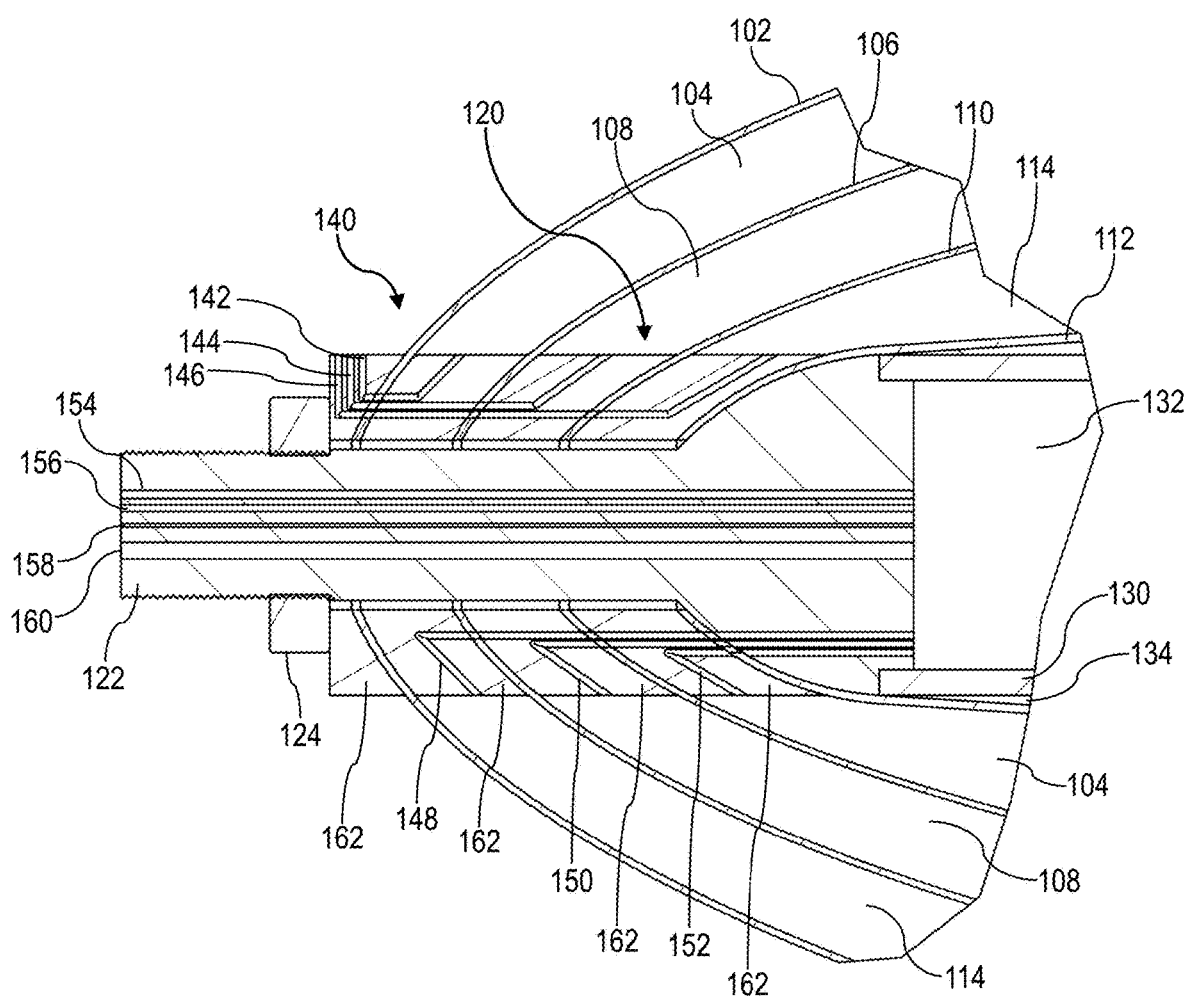
FIG. 1C is an enlarged view of section 1C of the liquid supply unit of FIG. 1B.

FIG. 1C is an enlarged view of section 1C of the liquid supply unit of FIG. 1B showing the forward cap 122 and its function as a manifold 140 for the liquids contained in the first compartment 104, second compartment 108, and third compartment 114. As the liquid supply unit may be configured to operate at high pressures, the forward cap is constructed using axially symmetric disks 162 that are stacked axially to reduce form drag. A symmetric geometry is also designed to maintain collinear center-of-mass, bladder, and pressure vessel 120 axes improving dynamic stability. According to the embodiment of FIG. 1C, the forward cap 122 is formed by four stacked disks. Each pair of stacked disks has a bladder wall 102, 106, 110, 112 clamped between them so that the bladder walls are secured to the forward cap. The forward nut 124 is tightened around the threaded forward cap to clamp the discs together and secure the elastic bladders to the pressure vessel 120. Of course, while discs are employed in the embodiment of FIG. 1C, any suitable arrangement may be employed to secure the elastic bladders to a pressure vessel, as the present disclosure is not so limited.

According to the embodiment of FIG. 1C, the forward cap 122 functions as a manifold 140 that allows for refilling and delivery of the liquids disposed in the first compartment 104, second compartment 108, and third compartment 114. As shown in FIG. 1C, the manifold includes a first inlet channel 142, a second inlet channel 144, and a third inlet channel 146, which are each fluidly connected to the first compartment 104, second compartment 108, and third compartment 114, respectively. The inlet channels may allow each compartment to be filed with liquid. In some embodiments, each of the inlet channels may include a check valve or another suitable valve configured to prevent liquid from flowing from the compartments out to the surrounding liquid environment. In some cases, the liquid supply unit may be refillable, such that the compartments may be depleted and then refilled underwater. Of course, a liquid supply unit may not be refillable or may be refillable out of water, as the present disclosure is not so limited. According to the embodiment of FIG. 1C, each of the compartments is connected to the pressure vessel compartment 132 inside of the tubular spine 130. As discussed previously, the pressure vessel compartment may include a generator such as a fuel cell which may employ the liquids contained in the compartment to generate energy. As shown in FIG. 1C, the manifold 140 includes a first feedline 148, a second feedline 150, and a third feedline 152 connected to the first compartment 104, second compartment 108, and the third compartment 114, respectively. The feedlines may be coupled to one or more pumps, which may drive liquid from the compartments to one or more desired portions of the pressure vessel compartment 132. In some embodiments, each feedline may be associated with a single pump so that each liquid may be supplied to the pressure vessel compartment at a particular volumetric flow rate. Of course, any suitable number of pumps may be employed to drive liquid from the compartments, as the present disclosure is not so limited. In some embodiments, pressure from the elastic bladders and/or surrounding environment may be used to selectively drive liquid through the feedlines. According to this embodiment, valves may be selectively activated to allow the liquid to flow from the elastic bladders to the pressure vessel compartment. Of course, in some embodiments a liquid supply unit may employ both pumps and selectively operable valves, as the present disclosure is not so limited.

In the particular embodiment of FIG. 1C, the inlet channels 142, 144, 146 and feedlines 148, 150, 152 are formed through the stacked discs 162. Additionally, liquid channels are formed through the elastic bladders so that the channels in each of the discs may be interconnected. The elastic bladders may function as a gasket for these channels, maintaining the liquid channels separate from the compartments 104, 108, 114 where appropriate. Of course, while a particular liquid channel arrangement is employed in the embodiment of FIG. 1C, any suitable manifold may be employed, including a manifold not integrated into the forward cap 122, as the present disclosure is not so limited.

In some cases, it may be desirable to pass liquids, power, or electricity between the pressure vessel 132 and the external environment. For example, power and/or data generated onboard the liquid supply unit may be passed to an associated underwater vehicle or another liquid supply unit. According to the embodiment of FIG. 1C, the forward cap 122 also includes a number of channels and liquid ports which may be used to pass liquids, power, and data. In particular, the forward cap 122 may include a negative terminal 154 and a positive terminal 156 which may be used to pass power generated onboard the liquid supply unit (e.g., with a fuel cell). The forward cap may also include a seawater port 158 which is configured to allow seawater into the pressure vessel 120. Such an arrangement may be beneficial if an active ballasting system is included inside of the pressure vessel. Additionally, seawater may be employed for temperature regulation (e.g., cooling) of various components inside of the pressure vessel. The seawater port may include a controllable valve configured to selectively allow seawater through the port. Finally, the forward cap may also include a data port 160 configured to allow data generated by the liquid supply unit (e.g., measured by one or more sensors) to be passed to an associated underwater vehicle, another liquid supply unit, or another appropriate device. In some embodiments, the negative terminal, positive terminal, and data port may have a suitable waterproof connection so that the terminals and data port are waterproofed in and out of use. Of course, while exemplary ports are shown and described herein with reference to the forward cap 122, any suitable number of electrical or liquid ports may be employed with a liquid supply unit and be included in any suitable component of the liquid supply unit, as the present disclosure is not so limited.

While specific elements are not shown inside of the pressure vessel compartment 132, it should be understood that the pressure vessel compartment may contain multiple components that may be configured to generate energy, store energy, generate thrust, sense the surrounding environment, and/or navigate. In some embodiments the pressure vessel compartment may include a power train. The power train may convert the chemical energy of liquid fuel components stored in the elastic bladders into thrust in a controlled trajectory. In some embodiments, components of the power train include a fuel distribution manifold (e.g., manifold 140), a fuel cell, an environmental controller, power conversion electronics, a battery, and actuators for propulsion and directional control. An example of such a power train is shown and described further with reference to FIG. 3. The components of the power train may be formed of metals with specific gravities greater than that of seawater. Accordingly, suitable materials such as foam 134 may added to the liquid supply unit with a specific gravity lower than that of seawater (or another liquid operating medium) to achieve neutral buoyancy. In some embodiments, a ballasting system may also be included within the pressure chamber to account for the density variations from sea-water temperature and salinity changes and the compression of the bladder material, liquid fuels, and pressure chamber at extreme depths.

Figure 1D:
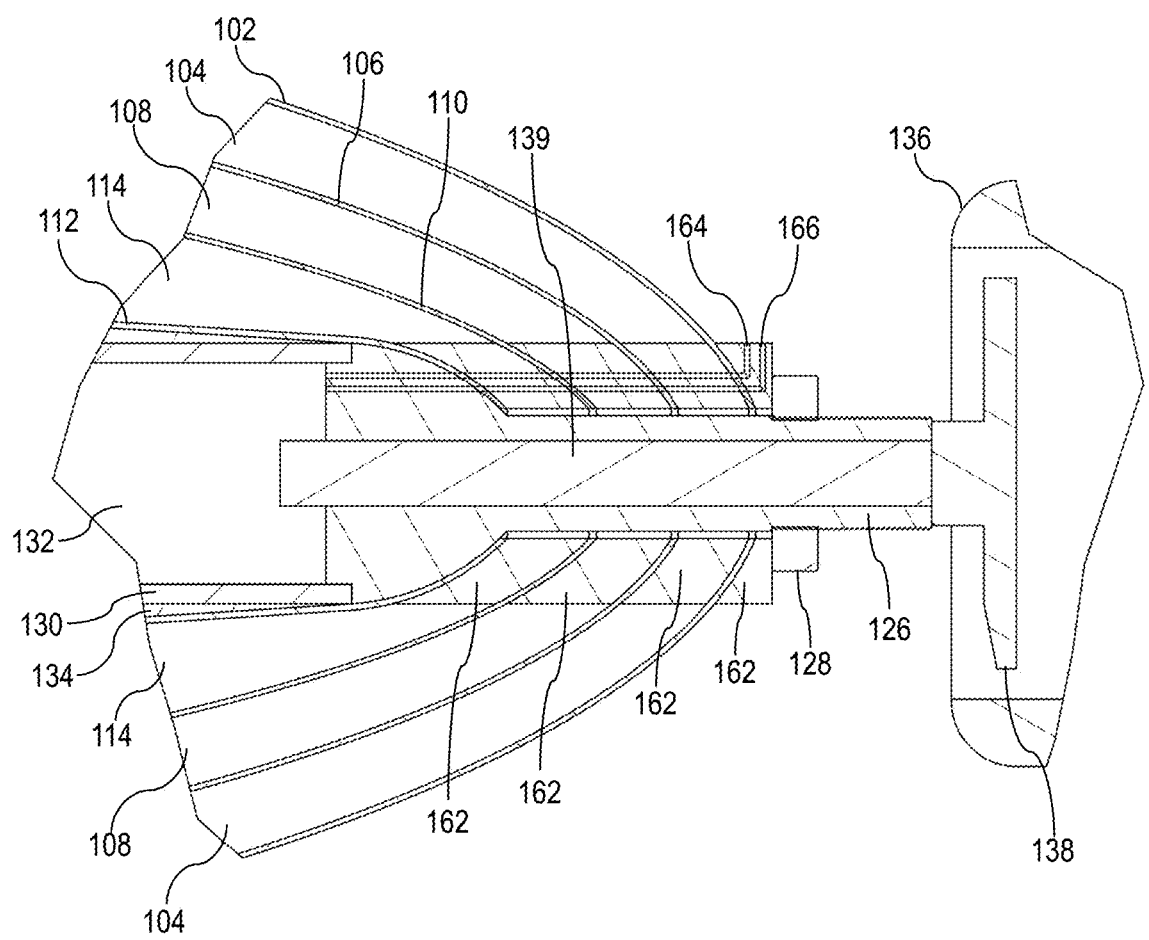
FIG. 1D is an enlarged view of section 1D of the liquid supply unit of FIG. 1B.

FIG. 1D is an enlarged view of section 1D of the liquid supply unit of FIG. 1B showing the aft cap 126 and the ducted propeller 136 components. Like the forward cap 122 described with reference to FIG. 1C, the aft cap 126 also includes a plurality of stacked discs 162 that are clamped together with an aft nut 128 to secure the elastic bladders to the pressure vessel. As shown in FIG. 1D, the aft cap includes a propeller shaft 139 coupled to a propeller blade 138. The propeller shaft may be coupled to a motor disposed in the pressure vessel compartment 132. As shown in FIG. 1D, the aft cap also includes a reaction product outlet channel 164 and a ballasting liquid outlet channel 166. The reaction product outlet may be configured to exhaust reacted liquids once they have been employed to generate power. For example, the reaction product outlet channel may exhaust the products from the reaction of a reductant and an oxidant from an outlet of a fuel cell. The ballasting liquid outlet channel may be configured to exhaust a ballasting liquid contained in one of the bladders. In some embodiments, the ballasting liquid outlet channel may also exhaust seawater when an active ballasting system is employed. In some embodiments, one or more exhaust ports may also be included in the forward cap 122 and one more reactants and ballasting liquid inlets may be included in the aft cap 126, as the present disclosure is not so limited. In some embodiments, rather than reacting liquid fuel components onboard the liquid supply unit, the liquid fuel components may be delivered to an external generator. In such an embodiment, the aft cap 126 or the forward cap 122 may include one or more ports configured to allow liquid in the bladders to be supplied to the external generator (e.g., via one or more liquid connectors). Of course, a liquid supply unit may include any number of outlet channels or ports allowing liquids in the elastic bladders, or products thereof, to be exhausted into the environment or delivered to an associated generator, as the present disclosure is not so limited.

Figure 2:
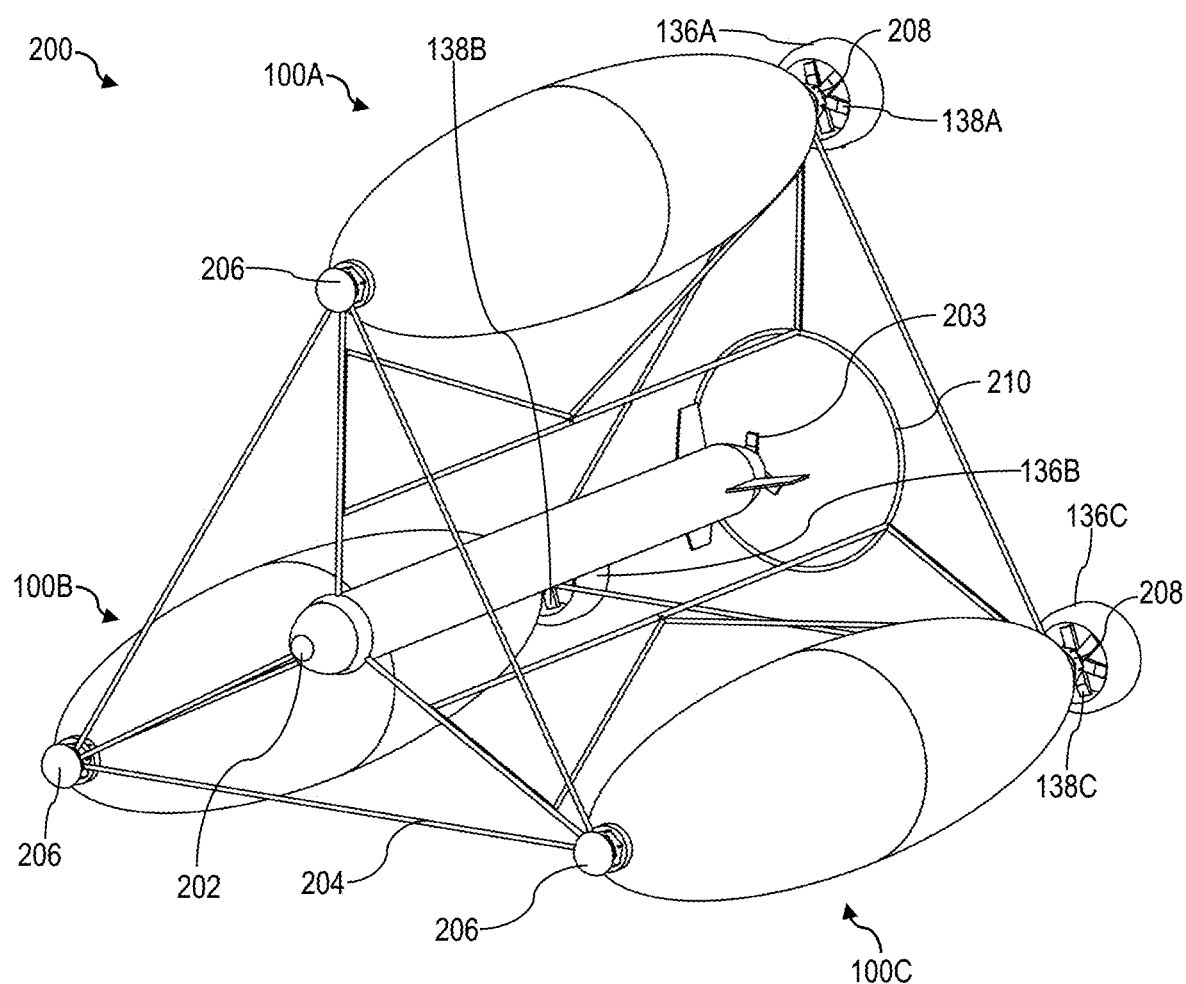
FIG. 2 is a perspective view of one embodiment of multiple liquid supply units in use with an underwater vehicle.

In some cases, it may be desirable to employ multiple liquid supply units together with an underwater vehicle. FIG. 2 is a perspective view of one embodiment of an underwater system 200 having multiple liquid supply units 100A, 100B, 100C in use with an underwater vehicle 202. According to the embodiment of FIG. 2, each of the liquid supply units 100A, 100B, 100C is like that described with reference to FIGS. 1A-1D. As shown in FIG. 2, the underwater vehicle is connected to the liquid supply units with scaffolding 204. The scaffolding is attached to the forward cap and aft caps of the liquid supply units with a front coupling 206 and a rear coupling 208, respectively. In some embodiments, the front coupling and/or the rear coupling may be configured to transfer power and/or data from each of the liquid supply units to the underwater vehicle 202. That is, wires extending through the scaffolding 204 may connect to each of the liquid supply units 100A, 100B, 100C and the underwater vehicle 202. According to the embodiment of FIG. 2, the scaffolding 204 has a triangular shape, where the underwater vehicle 202 is placed in the center of the triangle. Of course, other shapes for the scaffolding are contemplated, including other polygons, as the present disclosure is not so limited. As shown in FIG. 2, the scaffolding includes a circular support member 210 near the aft portion of the underwater vehicle 202. The circular support allows thrust from the underwater vehicle (e.g., from propeller 203) to pass through the scaffolding without significant interference. As shown in FIG. 2, each of the liquid supply units may include a ducted propeller 136A, 136B, 138C including a corresponding propeller blade 138A, 138B, 138C. Accordingly, the underwater system 200 may include four total thrusters, an arrangement that may enhance maneuverability compared to a system with a single thruster. Of course, an underwater system may include any suitable number of liquid supply units as well as any suitable number of thrusters, as the present disclosure is not so limited.

In some embodiments, the scaffolding 204 may be constructed from titanium, aluminum, aluminum alloy, another metal passivated to prevent electrochemical reactions with the sea, fiber glass composites, carbon fiber composites, or other appropriate material. In some embodiments, the scaffolding is neutrally buoyant due to containing pressure sealed micro-channels and/or being coated with foam. In some embodiments, foam or other form of ballasting may also be added to the liquid supply units 100A, 100B, 100C, or underwater vehicle to compensate for the specific gravity of the scaffolding.

According to the embodiment of FIG. 2, the underwater vehicle 202 may include communication equipment, a power source, propulsion and steering mechanisms, an embedded processor for controlling operation, and interface ports for polling the craft during maintenance and recharging internal power sources. The underwater vehicle may also contain navigation instrumentation and additional sensors either within the craft or towed tailored to mission needs. The underwater vehicle may also have a payload bay for deploying fixed underwater platforms and infrastructure. The components may be contained within a housing designed to withstand the maximum pressures the unit will experience. Of course, an underwater vehicle may have any suitable components, as the present disclosure is not so limited. In some embodiments, the underwater vehicle may include a battery or other energy storage components. In such an embodiment, the underwater vehicle may periodically detach from the scaffolding 204 and later reconnect to recharge its internal batteries.

Figure 3:
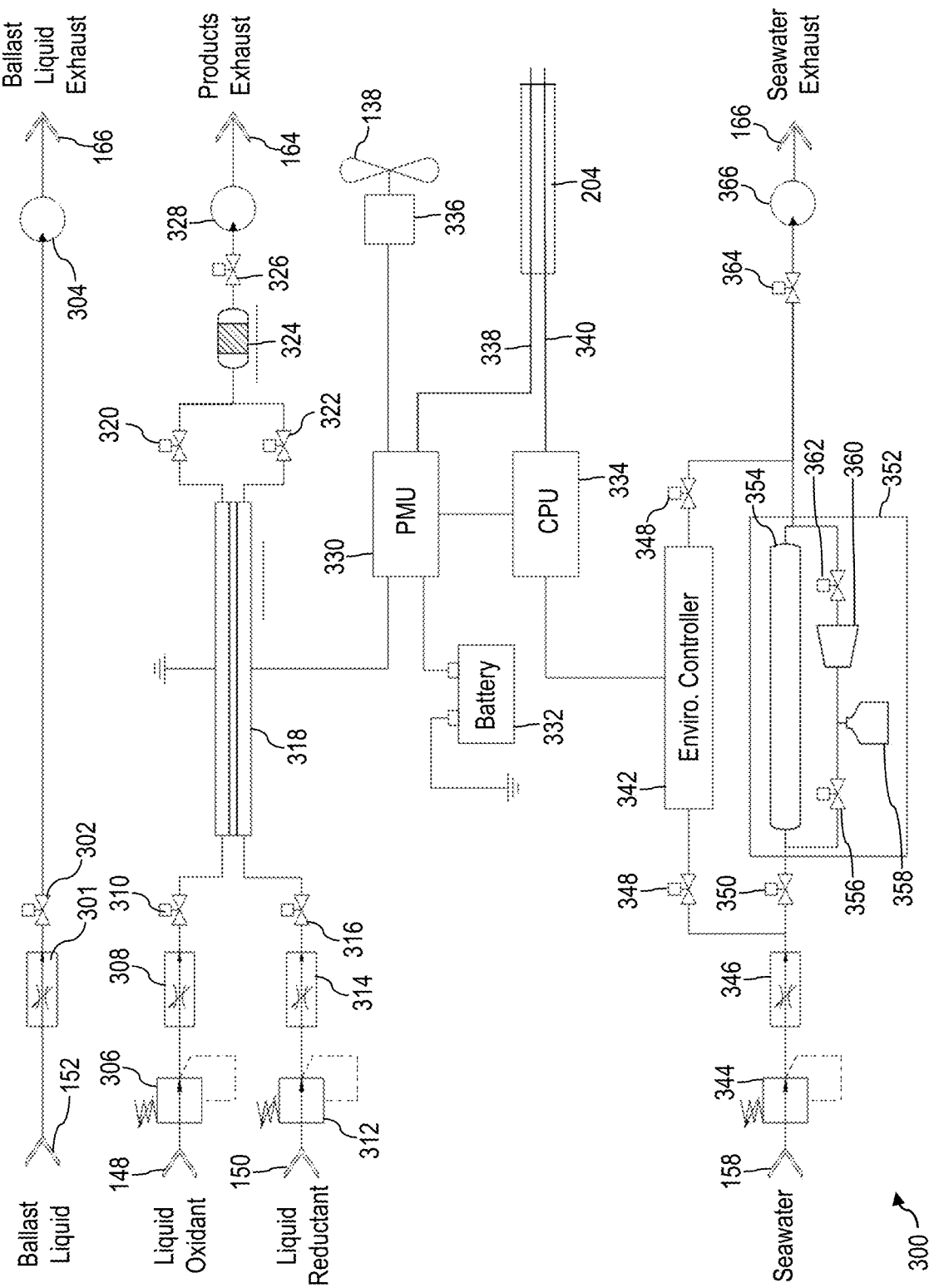
FIG. 3 is a schematic of one embodiment of a liquid supply unit.

FIG. 3 is a schematic of one embodiment of a liquid supply unit 300 showing possible internal components and liquid flow paths. As shown in FIG. 3, the liquid supply unit 300 includes a ballast liquid flow path. The ballast liquid flow path includes a feedline 152, a ballasting liquid valve 302, a ballasting liquid flow controller 301, a ballasting liquid pump 304, and a ballasting liquid outlet channel 166. The ballasting liquid valve and ballasting liquid pump may be configured to allow ballasting liquid to flow from a volume including the ballasting liquid through a pressure vessel to the outlet channel 166. The valve 302 and pump 304 may be controlled and coordinated by a central processing unit 334 which may include one or more processors and associated non-transitory memory including processor executable instructions that when implemented operate the liquid supply unit in the disclosed manner. In some embodiments, the ballasting liquid pump may be a peristaltic pump, in which case the ballasting liquid valve 302 may be omitted. Of course, any suitable pump and valve may be employed, as the present disclosure is not so limited.

As shown in FIG. 3, the liquid supply unit 300 also includes a power train including a fuel cell 318. The reactants, a liquid oxidant and liquid reductant, are introduced into a pressure vessel via oxidant feedline 148 and reductant feedline 150, respectively. While not depicted, the oxidant feedline and/or the reductant feedline may include one or more pressure regulators, flow controllers, and pumps configured to modulate a flow of the desired liquids through the associated feedlines in a controlled fashion. However, embodiments in which a pressure applied to the liquids within the associated volume is sufficient to cause flow through the feedlines are also contemplated. In either case, the power train may contain an oxidant flow controller 308, oxidant pressure regulator 306, and oxidant isolation valves 310, 320. Likewise, the power train includes a reductant flow controller 314, a reductant pressure regulator 312, and reductant isolation valves 316, 322. The isolation valves 310, 316, 320, 322 may be employed during refueling and flushing the fuel cell during maintenance to prevent flow along the associated flow path. Additionally, the isolation valves 310, 316, 320, 322 may be toggle valves, enabling pulsed rather than continuous flow operation if appropriate. The pressure regulators 306, 312 may drop the inlet pressure of the reductant and oxidant to the operating pressure of a fuel cell 318 and distribution tubing. The power train may also include a neutralizer 324 that is a heated chamber used to consume unreacted oxidant and reductant to minimize the environmental impact of the system. The power train may also include a neutralizer isolation valve 326. Finally, the power train also includes a power train pump 328 configured to build a sufficient head pressure to exhaust the products via a reaction products outlet channel 164.

According to the embodiment of FIG. 3, the liquid supply unit 300 is configured as a hybrid system, containing a battery 322 electrically coupled to the system to handle transient loading, average the discharge characteristics of the fuel cell, and recover energy when deaccelerating or performing maneuvers. The battery is connected to a power management unit 330 which distributes the electrical power generated by the fuel cell 318 to the various electrical components in the liquid supply unit. The power management unit supplies power to the battery 332, as well as the central processing unit 334, motor 336 powering a propeller 138, and an external power line 338 for supplying power to an associated underwater vehicle. The central processing unit may be configured to coordinate the power generation and thrust generation of the power processing unit, as well as communicate status information to an associated underwater vehicle, other liquid supply units, and/or any other system associated with the liquid supply unit. Additionally, the central processing unit may be connected to an environmental controller 342 including one or more processors which are configured to control a dynamic ballasting system and temperature regulation of the liquid supply unit. While not shown in the depicted embodiment, the central processing unit may be operatively connected to the various pumps, valves, and other components associated with the flows of ballasting liquid and fuels (e.g. a liquid oxidant and reductant) through the liquid supply unit. Thus, the central processing unit may be used to control operation of these various hydraulic components to regulate the flow of liquids through the liquid supply unit as described above.

According to the embodiment of FIG. 3, the liquid supply unit 300 includes an environmental system coordinated by the environmental controller 342 and/or central processing unit 334. As shown in FIG. 3, the environmental system includes a seawater inlet port 158, a seawater flow controller 346, and a seawater pressure regulator 344. From there, the seawater is configured to pass into two branches. First, the seawater may move toward the environmental controller 342 and environmental controller isolation valves 348. The environmental controller may employ the seawater for cooling the various electrical components of the power train, like the fuel cell 318, battery 332, central processing unit 334, power management unit 330, etc. Second, the seawater may move toward a dynamic ballasting system that may account for the density variations from differences in seawater temperature and salinity at varying depths and compressibility of the stored liquids and central craft at extreme depths. The ballasting system includes a ballast isolation valve 350, a ballasting tank 354, compressed air valves 356, 362, compressed air tank 358, and compressor 360. The valves may selectively allow seawater to fill the ballast tank, where air from the compressed air tank may be used to evacuate the seawater from the ballast tank where desired. Accordingly, the density of the ballast tank may be controlled to account for density variations in a liquid environment. The environmental system includes an exhaust valve 364 and an exhaust pump 366 configured to pressurize the seawater so that it may flow out of a seawater exhaust port 166. According to exemplary embodiments described herein, the dynamic ballasting system may be small relative to conventional vessels because the overall liquid volume carried by the liquid supply unit is neutrally buoyant, and the ballasting liquid, oxidant, and reductant may be exhausted in a predetermined ratio to maintain the neutral buoyancy of the combine liquid volume. In some embodiments, a wing or foil may be employed with control surfaces that are used to control the depth of the liquid supply unit without a dynamic ballasting system, or in addition to a ballasting system. In such an embodiment, forward motion generated by thrusters may be used to maintain a stable depth and/or change depth of the liquid supply unit.

Example: Possible Liquid Combinations

An example of the liquid supply unit was designed employing an ethanol/sodium hydroxide—hydrogen peroxide fuel cycle. The ethanol/sodium hydroxide—hydrogen peroxide reaction has an advantage that liquid phase products are formed. The fuel cell may be accordingly simplified, as only single phase transport occurs. However, a number of other reactions are compatible with the proposed architecture according to exemplary embodiments described herein as detailed above. For the ethanol/sodium hydroxide—hydrogen peroxide reaction, all the reactants are also relatively inexpensive and readily available. The product, aqueous sodium acetate is naturally occurring in sea-water. It is also used as an "eco-friendly" deicing agent, and large scale use around large bodies of water have been studied. For the ethanol/sodium hydroxide—hydrogen peroxide system, the net reaction is:

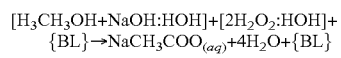
$\{BL\} \rightarrow NaCH_3COO_{(aq)} + 4H_2O + \{BL\}$ where the presence of additional dilutants and the ballasting liquid is also included. The various reactants may be diluted based on safety, handling considerations and to limit decomposition. Ballasting liquid is also added to the equation, and discharged in proportion to the diluted oxidant and reductant so that the entire composition remains neutrally buoyant through the underwater deployment, independent of the amount of reactants consumed. Tables 1 and 2 show exemplary liquids that may be employed to reach a combined volume of neutral density liquid, assuming a 50% aqueous solution of sodium hydroxide (by mass) and 50% aqueous solution of hydrogen peroxide (by mass) were used. The appropriate proportions of the liquids were determined using the stoichiometric ratio of the reactants along with Archimedes' principal for the overall combination of liquids for two different cases. For simplicity, the sea-water density is assumed constant. In practice deep sea vessels experience 1-2% levels of compression at extreme depths, and similar small changes in density can occur in sea-water due to temperature and salinity gradients. In practice, the amount of ballasting liquid discharged can be modulated accordingly based on depth, temperature, and salinity. A traditional ballasting system may also be included within the liquid supply unit to compensate for the changes based on depth, temperature, and salinity.

TABLE 1

| Material | Density | Mass Fraction |
|---|---|---|
| Ethanol | 0.79 g/cm³ | 10.1% |
| NaOH | 2.13 g/cm³ | 8.8% |
| HOH | 1 g/cm³ | 8.8% |
| H2O2 | 1.45 g/cm³ | 14.9% |
| HOH | 1 g/cm³ | 14.9% |
| Ballasting Liquid (Oil) | 0.92 g/cm³ | 42.4% |
| Combined Volume | 1.03 g/cm³ | 100% |

TABLE 2

| Material | Density | Mass Fraction |
|---|---|---|
| Ethanol | 0.79 g/cm3 | 13.6% |
| NaOH | 2.13 g/cm3 | 11.9% |
| HOH | 1 g/cm3 | 11.9% |
| H2O2 | 1.45 g/cm3 | 20.1% |
| HOH | 1 g/cm3 | 20.1% |
| Ballasting Liquid (Ethanol) | 0.79 g/cm3 | 22.4% |
| Combined Volume | 1.03 g/cm³ | 100% |

Range enhancement from a liquid supply unit of exemplary embodiments describe herein were calculated through applications of Newton's Law and reaction efficiency for a given initial volume of fuel, speed, and system geometry. Table 3 provides the inputs and results of an exemplary range calculation based on an analytic model which included drag reduction effects for circularly symmetric structures moving at constant speed with characteristic initial and final radius, fixed length and constant form and skin drag coefficients. Assuming lithium ion batteries and the associated ballasting to achieve neutral buoyancy occupy one half the volume of an underwater vehicle, the vehicle can travel approximately 400 nm. Assuming negligible contribution to drag from the scaffolding, the addition of three liquid supply units (e.g., as shown in FIG. 2) was shown to extend the total distance which can be traveled by an additional 2100 nm using fish oil and 2900 nm using ethanol as the ballasting liquid.

TABLE 3

| Description | Example Values |
|---|---|
| Number of Bladders | 3 |
| Initial radius of single bladder | 1.5 ft |
| Radius of fuel cell portion | 0.25 ft |
| Characteristic radius of payload | 0.5 feet |
| Form drag coefficient | 0.15 |
| Skin drag coefficient | 0.005 |
| Fuel energy density diluted to neutral buoyancy | 390 Whr/L (Fish Oil) 525 Whr/L (Ethanol) |
| Motor Efficiency × Propulsion Efficiency × Fuel Cell Efficiency | 0.8 × 0.6 × 0.4 |
| Length of Bladders (fuel cell assumed to be the same length) | 12 ft |
| Length of Underwater Vehicle | 9 ft |
| Density of Sea Water | 1030 kg/m³ |

TABLE 3-continued

| Description | Example Values |
|---|---|
| Speed | 4 knots = 2.06 m/s |
| K.E. of Sea-Water (stationary reference frame) at 1 knot speed (at 4 knots, multiply by 16) | 0.00003786 Watt Hour/Liter |
| Neutrally buoyant energy density of an advanced Lithium Ion Battery | ~100 Whr/L |
| Length of portion of underwater vehicle containing batteries | 4.5 feet |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. An underwater liquid supply unit, comprising:
a first bladder defining a first compartment for containing a first liquid;
a second bladder defining a second compartment for containing a second liquid;
a third bladder defining a third compartment for containing a third liquid, wherein at least one of the first bladder, second bladder, and third bladder forms an outermost wall of the liquid supply unit; and
a manifold connecting each of the first bladder, the second bladder, and the third bladder, wherein the manifold is configured to provide a separate flow path for each of the first liquid, second liquid, and third liquid, and wherein the first bladder, second bladder, and third bladder are configured to reduce in size in at least one dimension when the first liquid, second liquid, and third liquid flow out of the first, second, and third compartments respectively through the manifold.

2. The liquid supply unit of claim 1, further comprising the first liquid, second liquid, and third liquid, wherein volumes of the first liquid, second liquid, and third liquid provide substantially neutral buoyancy of a combined volume of the first liquid, second liquid, and third liquid in water.

3. The liquid supply unit of claim 2, wherein the first liquid is a ballasting liquid, the second liquid is a reductant, and the third liquid is an oxidant.

4. The liquid supply unit of claim 2 further comprising at least one flow modulator configured to dispense each of the first liquid, second liquid, and third liquid in a predetermined ratio to maintain the substantially neutral buoyancy of the combined volume of the first liquid, second liquid, and third liquid.

5. The liquid supply unit of claim 2, further comprising at least one flow modulator configured to dispense each of the first liquid, second liquid, and third liquid, wherein a first combined volume of the first liquid, second liquid, and third liquid prior to any dispensing is neutrally buoyant.

6. The liquid supply unit of claim 5, wherein a second combined volume of the first liquid, second liquid, and third liquid subsequent to dispensing is neutrally buoyant.

7. The liquid supply unit of claim 1, wherein the second bladder is disposed inside of the first bladder, the third bladder is disposed inside of the second bladder, and the first bladder, second bladder, and third bladder are coaxial.

8. The liquid supply unit of claim 7, further comprising a pressure vessel extending along a length of the first bladder, second bladder, and third bladder, wherein the pressure vessel is configured to support each of the first bladder, second bladder, and third bladder.

9. The liquid supply unit of claim 8, wherein the pressure vessel is coaxial with the first bladder, second, bladder, and third bladder.

10. The liquid supply unit of claim 9, wherein the first bladder at least partially surrounds the pressure vessel.

11. The liquid supply unit of claim 8, further comprising a fuel cell disposed within the pressure vessel, wherein the fuel cell is in fluid communication with the second compartment and the third compartment through the manifold.

12. The liquid supply unit of claim 11, further comprising a battery disposed in the pressure vessel and electrically connected to the fuel cell.

13. The liquid supply unit of claim 11, further comprising a motor electrically connected to the fuel cell and a propeller extending from an aft portion of the pressure vessel.

14. The liquid supply unit of claim 1, wherein the at least one dimension is a maximum transverse dimension perpendicular to a longitudinal axis of the liquid supply unit.

15. A method of operating a liquid supply unit, comprising:
dispensing a first liquid from a first volume;
dispensing a second liquid from a second volume;
dispensing a third liquid from a third volume; and
maintaining a neutral buoyancy of the liquid supply unit during the dispensing of each of the first liquid, second liquid, and third liquid by dispensing the first liquid, second liquid, and third liquid in a predetermined ratio.

16. The method of claim 15, wherein the first volume is contained in a first bladder, wherein dispensing the first liquid reduces a size of the first bladder in at least one dimension wherein the second volume is contained in a second bladder, wherein dispensing the second liquid reduces a size of the second bladder in at least one dimension, and wherein the third volume is contained in a third bladder, wherein dispensing the third liquid reduces a size of the third bladder in at least one dimension.

17. The method of claim 16, wherein each of the first liquid, second liquid, and third liquid is dispensed through a manifold.

18. The method of claim 16, wherein a pressure vessel extends along a length of the first bladder, second bladder, and third bladder, wherein the pressure vessel supports each of the first bladder, second bladder, and third bladder, and wherein each of the first liquid, second liquid, and third liquid are dispensed through the pressure vessel.

19. The method of claim 18, wherein the pressure vessel is coaxial with the first bladder, second, bladder, and third bladder.

20. The method of claim 19, wherein the first bladder at least partially surrounds the pressure vessel.

21. The method of claim 15, wherein a first combined volume of the first liquid, second liquid, and third liquid prior to dispensing is neutrally buoyant.

22. The method of claim 21, wherein a second combined volume of the first liquid, second liquid, and third liquid subsequent to dispensing is neutrally buoyant.

23. The method of claim 15, wherein the first liquid is a ballasting liquid, the second liquid is a reductant, and the third liquid is an oxidant.

24. The method of claim 15, further comprising delivering at least two of the first liquid, second liquid, and third liquid to a fuel cell.

25. The method of claim 24, further comprising generating power with the fuel cell, and delivering the power to a battery and/or a motor.

26. An underwater liquid supply unit, comprising:
a first bladder defining a first compartment for containing a first liquid, wherein the first bladder forms an outermost wall of the liquid supply unit;
a second bladder disposed inside of the first bladder defining a second compartment for containing a second liquid;
a third bladder disposed inside of the second bladder defining a third compartment for containing a third liquid; and
a manifold connecting each of the first bladder, second bladder, and third bladder and configured to provide a flow path for each of the first liquid, second liquid, and third liquid,
wherein the first bladder, second bladder, and third bladder are coaxial, wherein the first bladder, second bladder, and third bladder are configured to reduce in size in at least one dimension when the first liquid, second liquid, and third liquid flow out through the manifold respectively.

27. The liquid supply unit of claim 26, further comprising the first liquid, second liquid, and third liquid, wherein volumes of the first liquid, second liquid, and third liquid provide substantially neutral buoyancy of a combined volume of the first liquid, second liquid, and third liquid in water.

28. The liquid supply unit of claim 27, wherein the first liquid is a ballasting liquid, the second liquid is a reductant, and the third liquid is an oxidant.

29. The liquid supply unit of claim 27, further comprising at least one flow modulator configured to dispense each of the first liquid, second liquid, and third liquid in a predetermined ratio to maintain the substantially neutral buoyancy of the combined volume of the first liquid, second liquid, and third liquid.

30. The liquid supply unit of claim 26, further comprising a pressure vessel extending along a length of the first bladder, second bladder, and third bladder, wherein the pressure vessel is configured to support each of the first bladder, second bladder, and third bladder.

31. The liquid supply unit of claim 30, wherein the pressure vessel is coaxial with the first bladder, second, bladder, and third bladder.

32. The liquid supply unit of claim 31, wherein the first bladder at least partially surrounds the pressure vessel.

33. An underwater liquid supply unit, comprising:
a first bladder defining a first compartment for containing a first liquid, wherein the first bladder forms an outermost wall of the liquid supply unit;
a second bladder disposed inside of the first bladder defining a second compartment for containing a second liquid;
a third bladder disposed inside of the second bladder defining a third compartment for containing a third liquid;
a manifold connecting each of the first bladder, second bladder, and third bladder and configured to provide a flow path for each of the first liquid, second liquid, and third liquid; and
a processor configured to control a flow of fluid from the first, second, and third compartments through the manifold to maintain a neutral buoyancy of a combined volume of the first liquid, second liquid, and third liquid in a surrounding liquid.

34. The liquid supply unit of claim 33, further comprising the first liquid, second liquid, and third liquid, wherein volumes of the first liquid, second liquid, and third liquid provide substantially neutral buoyancy of the combined volume of the first liquid, second liquid, and third liquid in the surrounding liquid.

35. The liquid supply unit of claim 34, wherein the first liquid is a ballasting liquid, the second liquid is a reductant, and the third liquid is an oxidant.

36. The liquid supply unit of claim 34, further comprising at least one flow modulator configured to dispense each of the first liquid, second liquid, and third liquid, wherein the processor is configured to operate the at least one flow modulator to dispense the first liquid, second liquid, and third liquid in a predetermined ratio to maintain the substantially neutral buoyancy of the combined volume of the first liquid, second liquid, and third liquid.

37. The liquid supply unit of claim 33, further comprising a pressure vessel extending along a length of the first bladder, second bladder, and third bladder, wherein the pressure vessel is configured to support each of the first bladder, second bladder, and third bladder.

38. The liquid supply unit of claim 37, wherein the pressure vessel is coaxial with the first bladder, second, bladder, and third bladder.

39. The liquid supply unit of claim 38, wherein the first bladder at least partially surrounds the pressure vessel.

* * * * *